United States Patent [19]
Jaeschke

[11] 4,362,958
[45] Dec. 7, 1982

[54] ELECTROMAGNETIC COUPLING AND COOLING SYSTEM THEREFOR

[75] Inventor: Ralph L. Jaeschke, Kenosha, Wis.

[73] Assignee: Eaton Corporation, Cleveland, Ohio

[21] Appl. No.: 203,306

[22] Filed: Nov. 3, 1980

[51] Int. Cl.³ .............................................. H02K 9/00
[52] U.S. Cl. ...................................... 310/59; 310/63; 310/105
[58] Field of Search ................. 310/51, 52, 55, 57–65, 310/67, 266, 103, 105, 93

[56] References Cited

U.S. PATENT DOCUMENTS

| | | | |
|---|---|---|---|
| 2,745,974 | 5/1956 | Oetzel | 310/93 |
| 3,148,294 | 9/1964 | Jaeschke | 310/105 |
| 3,150,276 | 9/1964 | Moyer | 310/105 |
| 3,198,975 | 8/1965 | Fisher | 310/105 |
| 3,217,197 | 11/1965 | Sturzenegger | 310/105 |
| 3,641,375 | 2/1972 | Moyer | 310/105 |
| 3,889,786 | 6/1975 | Schrader et al. | 188/218 R |
| 3,996,485 | 12/1976 | Jaeschke | 310/103 |

Primary Examiner—R. Skudy
Attorney, Agent, or Firm—C. H. Grace; M. L. Union

[57] ABSTRACT

The present invention provides an electromagnetic coupling including a housing (13), the rotor (33), an inductor drum (25), including a generally cylindrical drum portion (27) having an outer heat dissipating surface including at least one generally circumferentially extending heat dissipating groove (57). A coil (47) is provided for coupling the rotor member and inductor drum. The housing includes openings therein for directing cooling fluid into the housing to dissipate heat generated in the inductor drum and a plurality of fluid directing means are attached to the outer heat dissipating surface of the inductor drum for rotation therewith. The fluid directing means (61) are obliquely disposed relative to the axis of rotation of the inductor drum to direct cooling fluid inwardly into heat dissipating grooves to cool the inductor drum. The utilization of fluid directing means which is obliquely disposed relative to the axis of rotation of the inductor drum substantially reduces the noise generated upon rotation of the inductor drum.

19 Claims, 5 Drawing Figures

ELECTROMAGNETIC COUPLING AND COOLING SYSTEM THEREFOR

BACKGROUND OF THE DISCLOSURE

1. Field of the Invention

The present invention relates to an electromagnetic coupling device, and more particularly to a system for dissipating heat from the inductor drum of such device.

Electromagnetic couplings of the type well known in the art include a rotor which is disposed within a rotatable inductor drum. A coil is energized to generate a magnetic field which electromagnetically couples the rotor and drum so that torque may be transferred therebetween. The passage of this magnetic field through the rotor and inductor drum results in the generation of heat during the transmission of torque partially as a result of "slip" between the rotor and the inductor drum (power in=power out+heat). The dissipation of heat has long been a problem in electromagnetic couplings and many different types of cooling systems have been tried in an effort to more effectively dissipate the generated heat. In general, the heat build up limits the speed ratio of the coupling. Thus, by increasing the heat dissipation of a particular size coupling, the speed ratio for that coupling can be increased.

2. Prior Art

The Jaeschke patent, U.S. Pat. No. 3,996,485, discloses an electromagnetic coupling and a rod cooling system therefor. The Jaeschke patent discloses a rotatable inductor drum in an electromagnetic coupling having a plurality of circumferentially disposed grooves therein. A plurality of rods are disposed contiguous to the grooves and each of the rods has a longitudinal axis parallel to the axis of rotation of the inductor drum. As the inductor drum rotates, the rods affect the flow of a cooling medium, which in the present instance is air, into the grooves to dissipate heat from the inductor drum as the inductor drum rotates. In the embodiment disclosed in the Jaeschke patent, U.S. Pat. No. 3,996,485, it has been found that the cooling rods impart noise vibrations to the air and other fixed portions of the coupling as the rods pass thereby. The movement of the cooling rods in a direction perpendicular to the longitudinal axis of the rods causes repetitive beats of air pressure as the rods come in close proximity with the housing and the air vents in the housing upon rotation of the inductor drum. These repetitive beats of air pressure impart noise vibrations to the air due to the fact that the entire length of each cooling rod comes in close proximity to the housing and the cooling vents therein simultaneously.

SUMMARY OF THE INVENTION

Accordingly, it is a provision of the present invention to provide an improved cooling system for dissipating heat from the inductor drum of an electromagnetic coupling and more specifically to a rod cooling system such as disclosed in the Jaeschke U.S. Pat. No. 3,996,485, wherein considerable noise reduction is accomplished without compromising the cooling system.

Another provision of the present invention is to provide a new and improved electromagnetic coupling including a housing, a rotor member disposed in the housing, inductor drum means disposed in the housing and rotatable about an axis of rotation relative to the rotor member, coil means for electromagnetically coupling the rotor and the inductor drum means and wherein the inductor drum includes a generally cylindrical drum portion defining an outer heat dissipating surface having a plurality of circumferentially extending heat dissipating grooves spaced apart along the longitudinal axis of the cylindrical drum portion. A plurality of fluid directing means are attached to the outer heat dissipating surface of the inductor drum for rotation therewith with the fluid directing means being obliquely disposed relative to the axis of rotation for directing cooling fluid inwardly into the heat dissipating grooves to cool the inductor drum means while reducing noise associated with operation of the coupling.

A further provision of the present invention is to provide a new and improved electromagnetic coupling including a housing, a rotor, an inductor drum rotatably disposed about an axis of rotation in the housing and rotatable relative to the rotor member, the inductor drum including a generally cylindrical drum portion defining a generally cylindrical outer heat dissipating surface with the heat dissipating surface defining at least one circumferentially extending heat dissipating groove extending substantially perpendicular to the longitudinal axis of the cylindrical drum portion, coil means for electromagnetically coupling the rotor member and the inductor drum and a plurality of fluid directing members disposed contiguous to the outer heat dissipating surface and attached thereto and wherein the fluid directing members are obliquely disposed relative to the axis of rotation to direct the cooling fluid inwardly into the heat dissipating grooves to cool the inductor drum.

Still another provision of the present invention is to provide an apparatus including first and second relatively rotatable mechanisms rotatable about an axis of rotation and including a first mechanism including a generally cylindrical drum portion disposed about the second mechanism. The first and second mechanisms during operative association generating heat in the drum portion and the drum defines an outer heat dissipating surface defining at least one circumferentially extending, heat dissipating groove oriented generally perpendicular to the longitudinal axis of the cylindrical drum portion. A plurality of fluid directing means is attached to the drum portion and disposed adjacent the outer heat dissipating surface. The fluid directing means are obliquely disposed relative to the axis of rotation and are operable to direct cooling fluid into the heat dissipating groove to effect cooling of the inductor drum.

DESCRIPTION OF THE PREFERRED EMBODIMENT

Figure 1:
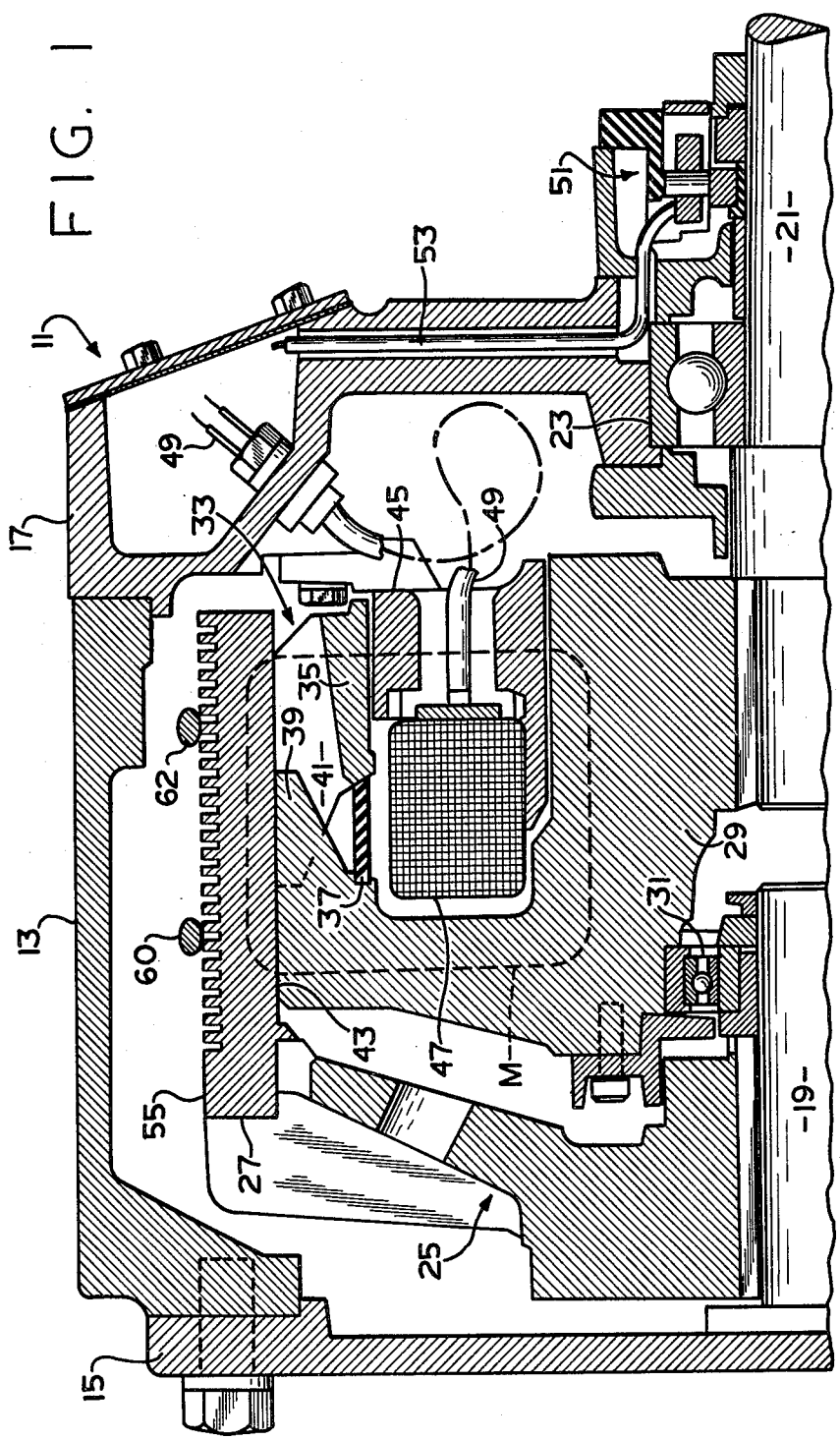
FIG. 1 is an axial half section of a typical electromagnetic coupling to which the cooling system of the present invention may be adapted.

Referring now to the drawings, which are for the purpose of illustrating preferred embodiments of the invention and not for limiting the same, FIG. 1 is a longitudinal half-section of a typical eddy-current coupling device to which the present invention may be adapted. The coupling device shown herein, generally designated 11, includes a central housing 13 and end-bells 15 and 17. The end-bell 15 supports a drive shaft 19 and the end-bell 17 supports a driven shaft 21, which is also supported by a set of bearings 23.

Keyed to the drive shaft 19 is an inductor assembly or inductor drum means 25 including a cylindrical inductor drum 27 which will be described in greater detail subsequently, but which is composed of a ferromagnetic material such as steel and which may have a substantially uniform magnetic reluctance. Keyed to the driven shaft 21 for rotation therewith is a magnetic field pole member or rotor member 29. A pilot bearing 31 is located between the drive shaft 19 and the pole member 29 to in part support the pole member 29 for rotation. The field pole member 29 includes a magnetic pole assembly 33, comprising a ring 35 supported on the field member 29 by a nonmagnetic spacer 37. The field pole member 29 and the ring 35 carry polar teeth or poles 39 and 41 respectively which are interdigitated. Between the teeth 39 and 41 and the inner surface of the inductor drum 27 is a narrow air gap or space 43 which allows relative rotation of the inductor drum 27 and the pole member 29.

End-bell 17 has attached thereto a stationary ring-shaped magnetic support 45 which supports an annular field coil 47. An electrical connection 49 is shown for exciting the field coil 47. A tachometer-type generator 51 driven by driven shaft 21 may be associated with the present coupling. The tachometer generator 51 establishes a signal on line 53 which is indicative of the speed of the output shaft 21 and which signal may be utilized by electrical circuitry, not illustrated, for controlling the speed of the output shaft 21, in a well known manner which forms no part of the present invention. It should be appreciated that the excitation of field coil 47 establishes a flux path, represented by the dotted line M, which electromagnetically couples the field pole member 29 and the inductor drum 27 so that rotation of the inductor drum 27 effects rotation of the pole member 29. The magnitude of the energization of field coil 47 controls the slip between the pole member 29 and the inductor drum 27 in a well known manner.

During operation of the electromagnetic coupling device 11, relative rotation between the pole member 29 and inductor drum 27 results in the generation of eddy-currents in the drum 27 (thus, the term "eddy-current coupling"). These eddy-currents produce a magnetic field which permits the transmission of torque from the inductor assembly 25 to the pole member 29 as discussed above. Normally, a certain amount of "slip" occurs during the rotation of the assembly 25 and pole member 29 and such slip, or difference in rotational speed, generates heat in the inductor drum 27.

Figure 2:
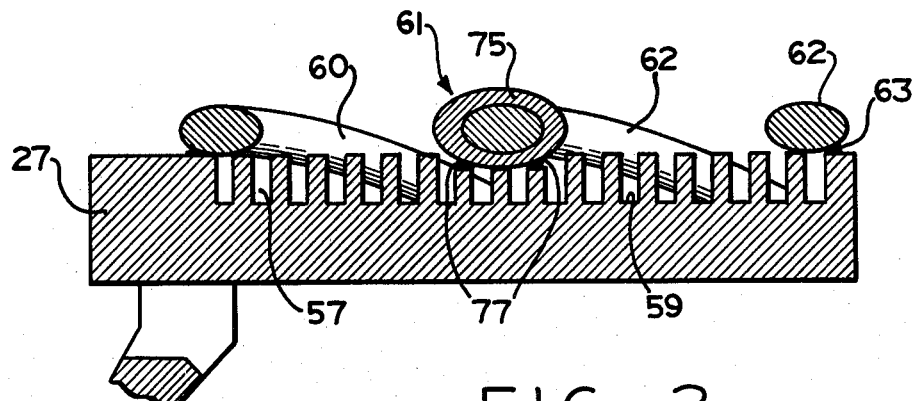
FIG. 2 is an enlarged fragmentary cross sectional view, illustrating the present invention taken approximately along line 2—2 of FIG. 4.
Figure 3:
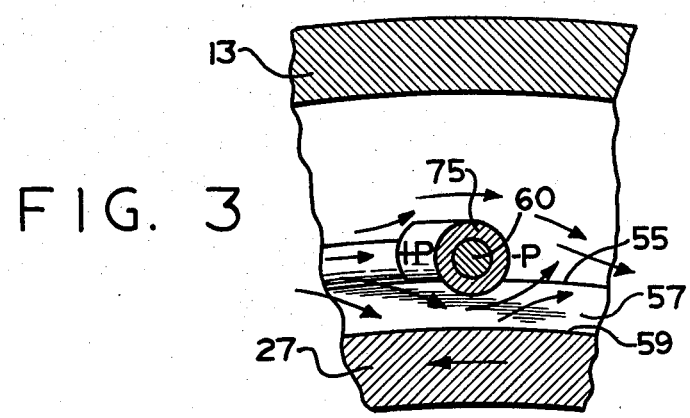
FIG. 3 is an enlarged fragmentary cross sectional view more fully illustrating the interreaction of the cooling rods and the housing.

As is shown in FIG. 1, and on a larger scale in FIGS. 2 and 3, the inductor drum 27 which, in the subject embodiment is cylindrical, has an outer, heat-dissipating surface 55. The inductor drum 27 also includes a plurality of heat-dissipating grooves 57, each of which terminates at its radially-inward extremity in a bottom surface 59. While the heat-dissipating grooves 57 may have any one of a number of configurations, such as one continuous, helical groove, the groove arrangement in the subject embodiment comprises a plurality of individual, circumferentially extending grooves which are spaced apart in a direction parallel to the longitudinal axis of the cylindrical portion of the inductor drum means 25.

The inductor assembly 25 further includes a plurality of fluid-directing means 61 attached to the outer, heat-dissipating surface 55. The fluid directing means 61 may be closely spaced apart with respect to the surface 55, but preferably, are fixedly attached contiguous with the surface 55, as by means of a series of weldments 63. Each of the fluid-directing means 61, as shown herein, may be comprised of two fluid-directing members 60, 62 which are generally cylindrical, but may have various other crosssectional configurations such as oval, which will achieve the purpose of directing the cooling medium into the heat-dissipating grooves, as will be described in greater detail subsequently. In addition to direction cooling fluid, the members 60, 62, while moving with the rotating inductor drum 27 and in contact with the heat-dissipating surface 55, serve to dissipate heat conducted thereto, in the nature of cooling vanes. Each of the members 60, 62 is fixedly attached to the inductor drum 27 by weldments 63 which, as is illustrated in FIG. 2 are preferably disposed at the ends of the members 60, 62 opposite their adjacent ends. To overcome the problem associated with thermal expansion of the inductor drum 27, there is provided an expansion means in the form of a slip joint 75 surrounding the adjacent ends of the members 60, 62 and preferably fixedly attached to the surface 55 by a weldment 77.

It will be appreciated that the coupling device 11 may include some means (not shown) for directing cooling fluid to the interior of the housing 13, such as a blower (not shown), or even merely an orifice or opening (not shown) in the housing 13. It has been found possible, with the use of the present invention, to obtain sufficient heat transfer to eliminate the need for any auxiliary cooling means, such as a blower.

Referring now primarily to FIG. 3, the inductor drum 27 is illustrated as rotating in a counterclockwise direction. Thus, each of the members 60, 62 is moving in the same direction into the cooling medium, normally air. The movement of the members 60, 62 into the cooling air within the housing 13 causes a buildup of positive air pressure (+P) adjacent the leading surface of the member 60, 62 and a region of negative (−P) air pressure adjacent the trailing surface. The air impinging against the member is divided as shown in FIG. 3 with a portion of the air being forced inwardly into the heat-dissipating grooves 57. At least a portion of the cooling air entering the groove 57 impinges against the bottom surface 59 and is thereby redirected outwardly from the groove 57 and away from the drum 27, transferring heat away from the bottom surface 59, which is especially important in view of the fact that the eddy-currents result in the generation of heat deep within the drum portion 27. It should be clearly understood that the arrows in FIG. 3 are merely intended to represent the incidence of air into the groove as well as the flow of air therefrom, and are not intended to indicate the actual angles of incidence and redirection, which would be determined by the particular geometry of the fluid-directing members 61 and grooves 57. A further understanding of the present invention will be had by reference to U.S. Pat. No. 3,996,485, which is incorporated herein by reference.

In the subject embodiment, a plurality of the members 60, 62 have been utilized, each of which extends in an oblique direction relative to the longitudinal axis of the cylindrical drum portion 27. In the embodiment disclosed in FIG. 4 the fluid directing members 61 are all skewed relative to the axis of rotation and all of the members 61 are parallel to each other. While the fluid directing members may be equally spaced about the circumference of the cylindrical drum portion 27, as illustrated, it is normally preferred, for maximum noise reduction, that the fluid-directing members 60, 62 be unequally spaced circumferentially about the surface 55 at unequal intervals. While the plurality of fluid directing members are unequally spaced about the circumference of the cylindrical drum 27, the arrangement of the fluid directing members is such as to balance the centrifugal forces acting on the cylindrical drum upon rotation thereof.

The arrangement of the fluid directing members 60, 62 obliquely relative to the axis of the drum 27 and hence the axis of rotation of the drum 27, reduces the noise associated with operation of the coupling. In the prior art designs of the coupling, such as shown in U.S. Pat. No. 3,996,485, each of the fluid-directing members came into close proximity with the housing 13 simultaneously along its entire length. The simultaneous repetitive passing of the entire length of each fluid-directing member 61 by the housing portion 13 causes beats of air pressure due to the close proximity of the housing 13 and the fluid-directing members. This is also true when the fluid-directing members 61 pass by orifices or openings in the housing. In order to reduce the noise level associated with the present coupling, the fluid directing members 61 are disposed obliquely relative to the axis of rotation of the drum 27. Thus, when the fluid directing members 61 pass in close proximity to the housing 13, they do not simultaneously pass in close proximity along their entire length but rather pass in close proximity only along one portion thereof at each instance of rotation of the inductor drum 27. This eliminates the beats of air pressure which are converted into noise producing vibrations which are associated with the prior art couplings and substantially reduces the noise level associated with the coupling. For example, in the embodiment shown in FIG. 5, to be described more fully hereinbelow, the construction of the present coupling accomplished a noise reduction of 4 to 6 DBa over the prior art couplings disclosed in U.S. Pat. No. 3,996,485. Realizing that 3 DBa halves the noise level, the present invention accomplishes a considerable reduction in the noise level of the associated coupling.

Figures 4, 5:
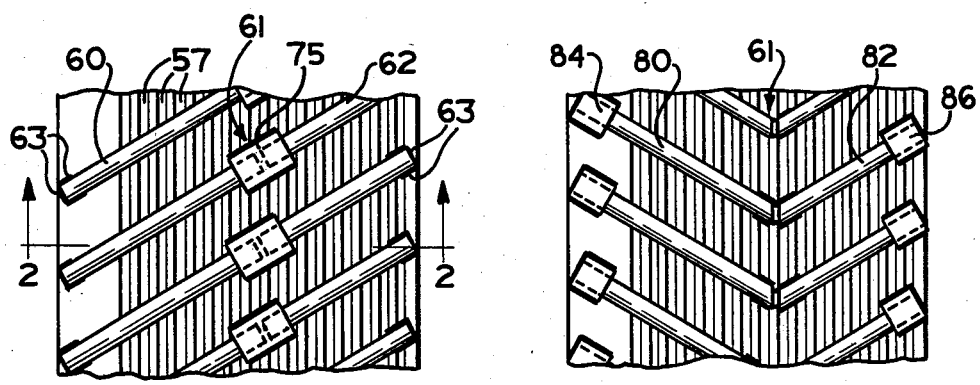
FIG. 4 is a plan view of an inductor drum utilizing cooling rods which are disposed obliquely relative to the axis of rotation.
FIG. 5 is a plan view of another embodiment of the present invention illustrating substantially V-shaped cooling rods which are disposed obliquely relative to the axis of rotation.

Referring to FIG. 5, another embodiment of the invention is disclosed and like numerals will be used to indicate like parts. In FIG. 5, the fluid directing means 61 comprise pairs of fluid-directing members 80, 82 which are obliquely disposed relative to the axis of rotation of the drum 27. The members 80, 82 are shaped in a "V" manner to prevent the fluid directing means 61 from simultaneously passing in close proximity with the housing 13 along their entire length. Each of the members 80, 82 is preferably welded at its adjacent end portion by a suitable weldment, not illustrated, and the opposite ends of members 80, 82 are located in slip joints 84, 86, respectively. The slip joints function in an identical manner to the slip joint 75 disclosed in FIG. 2 and allow relative movement between the drum and the rods 80, 82 in an axial direction upon thermal expansion of the drum 27.

The plurality of fluid-directing means 61 comprised of the members 80, 82 are disposed about the circumference of the drum 27 and all of the fluid-directing means 61 are disposed substantially parallel to each other. It should be apparent that the construction shown in FIG. 5 operates in a manner similar to the construction illustrated in FIG. 4 to cool the inductor drum 27 while reducing noise levels associated with the electromagnetic coupling by disposing the fluid directing means 61 obliquely relative to the axis of rotation of the drum 27.

While the present cooling arrangement has been disclosed in relationship to an electromagnetic coupling, it should be appreciated that the cooling arrangement could be utilized in any apparatus wherein a cylindrical rotating drum is desired to be cooled.

From the foregoing it should be apparent that a new and improved apparatus has been provided including first and second relatively rotatable mechanisms including a drum portion defining a heat dissipating outer surface having at least one circumferentially extending, heat-dissipating groove oriented generally perpendicular to the longitudinal axis of the cylindrical drum and including a plurality of fluid directing means attached to the drum portion and disposed adjacent to the outer heat-dissipating surface to direct cooling fluid into the heat-dissipating grooves to effect cooling of the drum. The fluid directing means are obliquely disposed relative to the axis of rotation of the drum to prevent each of the fluid directing means from coming in close proximity with the housing simultaneously along the entire length thereof. Such a construction substantially reduces the noise levels associated with similar mechanisms.

I claim:

1. An electromagnetic coupling comprising:
   (a) a housing;
   (b) a rotor member disposed in said housing;
   (c) inductor drum means disposed in said housing and rotatable about an axis of rotation relative to said rotor member;
   (d) coil means for producing an electromagnetic field for electromagnetically coupling said rotor member and said inductor drum means;
   (e) said inductor drum means including a generally cylindrical drum portion, said drum portion defining an outer, heat-dissipating surface, said heat-dissipating surface including a plurality of circumferentially extending, heat-dissipating grooves spaced apart along the longitudinal axis of said cylindrical drum portion;
   (f) means for directing cooling fluid into said housing to dissipate heat generated in said inductor drum means; and
   (g) a plurality of fluid-directing means attached to said outer, heat-dissipating surface of said inductor drum means for rotation therewith, said fluid directing means being obliquely disposed relative to said axis of rotation for directing said cooling fluid inwardly into said heat-dissipating grooves to cool said inductor drum means.

2. An electromagnetic coupling as defined in claim 1 wherein said cylindrical drum portion of said inductor drum means is substantially impermeable to radial flow of said cooling fluid.

3. An electromagnetic coupling as defined in claim 1 wherein each of said plurality of heat-dissipating grooves terminates, inwardly, in a bottom surface, said fluid-directing means directs said cooling fluid inwardly to contact said bottom surface of said heat-dissipating grooves and said bottom surface directs said cooling fluid outwardly from said cylindrical drum portion to dissipate heat from said inductor drum means.

4. An electromagnetic coupling as defined in claim 1 wherein said fluid-directing means are elongated, generally cylindrical members.

5. An electromagnetic coupling as defined in claim 4 wherein said plurality of fluid-directing means are disposed generally parallel to one another and extend across each of said plurality of circumferentially extending, heat-dissipating grooves.

6. An electromagnetic coupling as defined in claim 1 wherein each of said fluid-directing means includes expansion means to accommodate thermal expansion of said drum portion.

7. An electromagnetic coupling as defined in claim 6 wherein:
 (a) each of said fluid-directing means including at least a pair of elongated, generally cylindrical members having adjacent ends; and
 (b) said expansion means comprises a joint member restraining the adjacent ends of said adjacent members against relative transverse movement and providing for relative movement between said pair of members in a direction substantially parallel to the longitudinal axis of each of said members.

8. An electromagnetic coupling as defined in claim 7 wherein said joint member comprises a generally cylindrical sleeve member surrounding the adjacent ends of said adjacent members, permitting relative axial movement thereof.

9. An electromagnetic coupling as defined in claim 6 wherein each of said fluid-directing means including a pair of adjacent elongated members each of which has one end thereof fixedly attached to said drum portion and an opposite end associated with the opposing end of said adjacent elongated member for relative movement therebetween.

10. An electromagnetic coupling as defined in claim 5 wherein each of said plurality of fluid directing means comprises an elongate generally cylindrical straight member.

11. An electromagnetic coupling as defined in claim 5 wherein each of said plurality of fluid directing means comprises a pair of elongate generally cylindrical members which cooperate to form a V-shaped configuration.

12. An electromagnetic coupling as defined in claim 4 wherein said plurality of elongated generally cylindrical members are unequally spaced about the circumference of said cylindrical drum portion and are spaced about the circumference of said cylindrical drum portion to balance the centrifugal forces acting on said cylindrical drum portion.

13. An electromagnetic coupling comprising:
 (a) a housing;
 (b) a rotor member rotatably disposed within said housing;
 (c) inductor drum means rotatably disposed about an axis of rotation in said housing and rotatable relative to said rotor member;
 (d) said inductor drum means including a generally cylindrical drum portion defining a generally cylindrical, outer, heat-dissipating surface, said heat-dissipating surface defining at least one circumferentially extending, heat-dissipating groove extending substantially perpendicular to the longitudinal axis of said cylindrical drum portion;
 (e) coil means for establishing a flux path upon energization thereof to electromagnetically couple said rotor member and said inductor drum means;
 (f) means for directing cooling fluid to the interior of said housing to dissipate heat generated in said inductor drum means, said cylindrical drum portion being substantially impermeable to radial flow of said cooling fluid; and
 (g) a plurality of fluid-directing members disposed contiguous to said outer, heat-dissipating surface, and attached thereto, said fluid directing members being obliquely disposed relative to said axis of rotation and directing said cooling fluid inwardly into said heat-dissipating groove to effect cooling of said inductor drum means.

14. An electromagnetic coupling as defined in claim 13 wherein each of said plurality of fluid-directing members is disposed generally parallel to one another.

15. An electromagnetic coupling as defined in claim 13 wherein said heat-dissipating groove terminates, inwardly, in a bottom heat-dissipating surface and rotation of said cylindrical drum portion defines a leading surface and a trailing surface on each of said plurality of fluid-directing members, said rotation causing positive pressure adjacent said leading surface and negative pressure adjacent said trailing surface, the differential between said positive pressure and said negative pressure forcing a portion of said cooling fluid inwardly into said dissipating groove to impinge upon said bottom heat-dissipating surface to cool said cylindrical drum portion.

16. An electromagnetic coupling as defined in claim 13 wherein said fluid-directing members are elongated, generally cylindrical members.

17. An electromagnetic coupling as defined in claim 13 wherein each of said plurality of fluid direction means comprises an elongate generally cylindrical straight member.

18. An electromagnetic coupling as defined in claim 13 wherein each of said plurality of fluid directing means has an elongate generally cylindrical V-shaped configuration.

19. An electromagnetic coupling as defined in claim 13 wherein said plurality of fluid directing means are unequally spaced about the circumference of said cylindrical drum portion and are spaced about the circumference of said cylindrical drum portion to balance the centrifugal forces acting on said cylindrical drum portion.

* * * * *